US007216669B2

(12) United States Patent
Braeuer et al.

(10) Patent No.: US 7,216,669 B2
(45) Date of Patent: May 15, 2007

(54) PRESSURE REGULATING VALVE FOR COMMON RAIL FUEL INJECTION SYSTEMS

(75) Inventors: Christian Braeuer, Steyr (AT); Stefan Holl, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/899,086

(22) Filed: Jul. 27, 2004

(65) Prior Publication Data

US 2005/0022875 A1 Feb. 3, 2005

(30) Foreign Application Priority Data

Jul. 29, 2003 (DE) ................................ 103 34 615

(51) Int. Cl.
*F16K 17/06* (2006.01)
*F02M 63/00* (2006.01)

(52) U.S. Cl. .................. 137/529; 251/129.15; 123/458

(58) Field of Classification Search ................ 137/529; 251/129.15

See application file for complete search history.

(56) References Cited

U.S. PATENT DOCUMENTS 3,791,408 A * 2/1974 Saitou et al. ............... 137/529
5,456,233 A * 10/1995 Felhofer ..................... 123/447
5,462,253 A * 10/1995 Asthana et al. ............. 251/121
6,349,703 B1 * 2/2002 Rapp .......................... 123/458
6,408,824 B1 6/2002 Pacucci et al.

FOREIGN PATENT DOCUMENTS

EP 1 219 828 A2 7/2002

* cited by examiner

*Primary Examiner*—Ramesh Krishnamurthy
(74) *Attorney, Agent, or Firm*—Ronald E. Greigg

(57) ABSTRACT

A pressure regulating valve for regulating the pressure in a common rail with a pistonlike valve member which is guided axially displaceably in a bore and acts in the closing direction on a closing element and presses it against a valve seat; the valve member forms an armature of an electromagnet to which electrical current can be supplied. The opening cross section of the inlet of the pressure regulating valve is designed such that the pressure regulating valve cannot be opened until beyond a predetermined minimum fuel pressure greater than or equal two 250 bar. In this way, even if the electromagnetic closing force fails, a minimum pressure at the valve outlet is generated and thus makes an injection event possible.

1 Claim, 1 Drawing Sheet

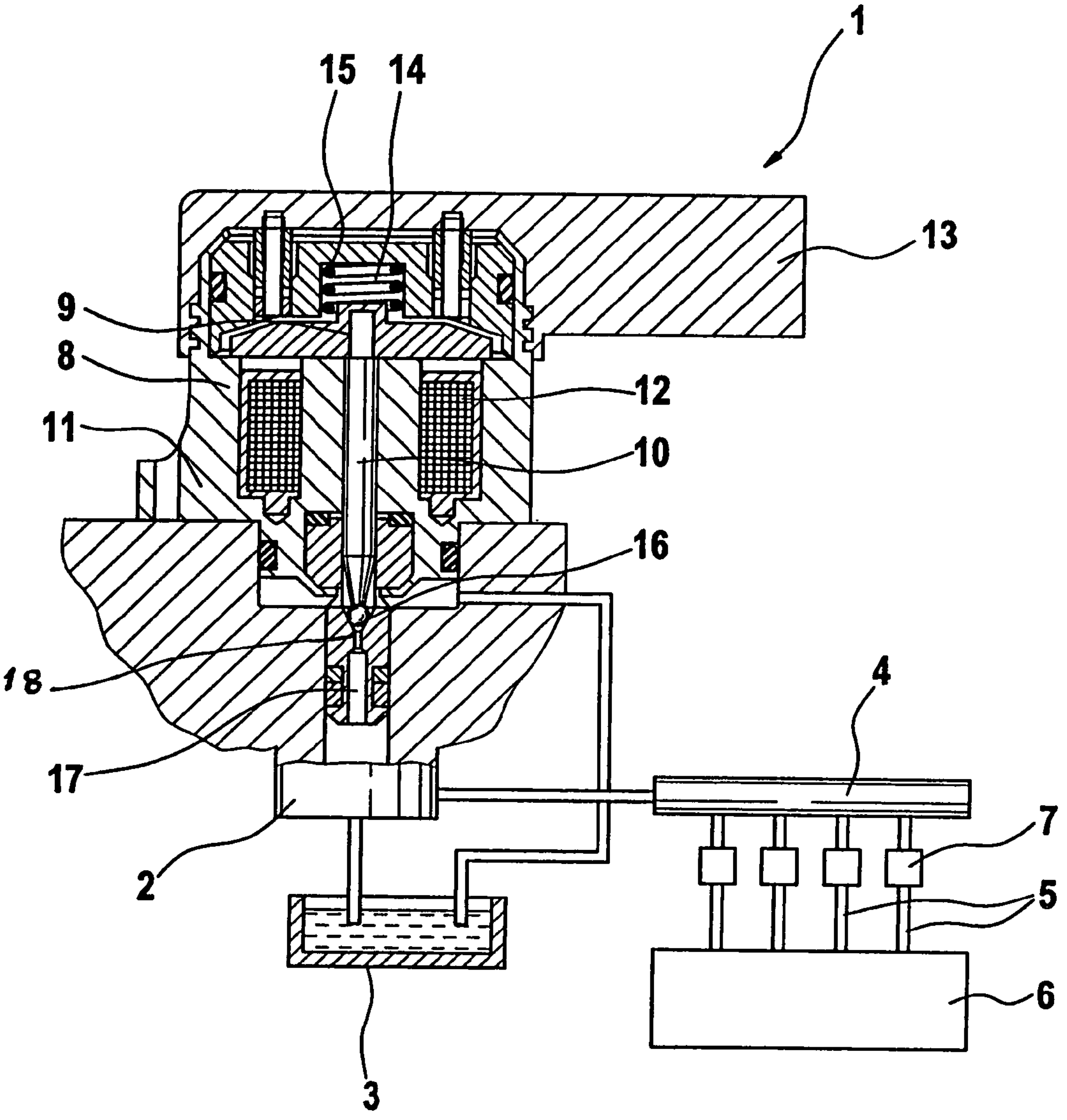
1
15
14
13
9
8
12
11
10
16
18
4
17
7
2
5
6
3

PRESSURE REGULATING VALVE FOR COMMON RAIL FUEL INJECTION SYSTEMS

BACKGROUND OF THE INVENTION

1. Field of the Invention

The invention relates to a common rail fuel injection system for internal combustion engines, having a pressure regulating valve for regulating the pressure in a common rail, having a pistonlike valve member guided axially displaceably in a bore, which valve member acts in the closing direction on a closing element and presses it against a valve seat, and the valve member forms an armature of an electromagnet that can be supplied with electric current.

2. Description of the Prior Art

Many versions of pressure regulating valves of the type with which this invention is concerned are known for regulating the pressure in a common rail, with which it communicates via an inlet. The pressure regulating valve has a pistonlike valve member, which is guided axially displaceably in a bore and can move counter to a force which is exerted on the valve member preferably by the current in the electromagnet. The force acts in the closing direction, so that the valve member is pressed against a closing element of the pressure regulating valve and against a valve seat. The valve member forms an armature of an electromagnet, which can be supplied with current to control the force.

By means of the supply of current, the closing element is pressed via the valve member against the valve seat with a certain force, whereupon as a result of the pressure acting on it the closing element is lifted from the valve seat in the common rail, if the force generated by the pressure exceeds the closing force that is exerted on the closing element via the valve member. If so, fuel flows out of the common rail into a relief chamber via the opened pressure regulating valve.

If a higher pressure is set in the common rail, the current in the electromagnet is increased, thus increasing the closing force, and accordingly only at a higher pressure in the common rail does the closing element lift from the valve seat and allow fuel to flow out of the common rail into the relief chamber.

In addition, the valve is often provided with a mechanical spring, which in its state of repose, that is, while the engine is stopped, assures that the valve is closed and fuel cannot get into the relief chamber. The mechanical spring force of this spring, however, can already easily be overcome by a slight fuel pressure. It is then impossible for a sufficiently high pressure to be built up in the common rail. The requisite minimum pressure in the common rail is assured only by the action of the electromagnetically generated closing force.

If some malfunction in supplying current to the electromagnet occurs, for instance from loosening of the plug involved, causing a failure of the electromagnetic closing force, then fuel at low pressure can get into the relief chamber and make an injection possible. The vehicle can then no longer be driven.

OBJECT AND SUMMARY OF THE INVENTION

The object of the invention is to improve the pressure regulating valve known from the prior art in such a way that even if the electromagnetic closing force fails, it generates a minimum pressure at the valve outlet and thus makes emergency vehicle operation possible.

This object is attained according to the invention in that the opening cross section of the inlet of the pressure regulating valve is designed such that the pressure regulating valve cannot be opened until beyond a predetermined minimum fuel pressure, so that emergency vehicle operation is made possible (an injection event is made possible).

Alternatively, a throttle element can be provided in the inlet, and with it a minimum pressure beyond which the pressure regulating valve can be opened can be regulated.

By means of the pressure in the common rail, a force acts on the valve member of the pressure regulating valve. This force acts via the area which is made available by the inside diameter of the inlet. If this force generated by the pressure is greater than the sum of the forces acting on the valve member in the closing direction, then the valve member lifts from the valve seat and opens the pressure regulating valve. If there is no current to the electromagnet, then this sum is composed solely of the weight of the valve member and the force of the mechanical spring. If the area of the inlet is large, then in this case even a slight fuel pressure suffices to open the pressure regulating valve.

The throttling action in the inlet of the pressure regulating valve has the effect that regardless of the action of the electromagnetic force, a minimum pressure can build up in the common rail that is high enough to enable an injection event.

Regulating the injection pressure is done independently of this, by way of the supply of current to the electromagnet. If nevertheless the electromagnet fails because of a malfunction, then at least emergency vehicle operation is still possible.

BRIEF DESCRIPTION OF THE DRAWING

The invention will be better understood and further objects and advantages thereof will become more apparent from the ensuing detailed description of a preferred embodiment taken in conjunction with the single drawing FIGURE which is a section through the pressure regulating valve of the invention along with its disposition relative to the common rail and the fuel tank.

DESCRIPTION OF THE PREFERRED EMBODIMENT

In the FIGURE, a longitudinal section through a pressure regulating valve 1 is shown. Additionally, a common rail fuel injection system for internal combustion engines, in particular self-igniting engines, is shown in schematic form. The common rail fuel injection system has a high-pressure pump 2, by which fuel at high pressure is pumped out of a fuel tank 3 into a common rail 4. The common rail 4 is embodied in tubular form as a so-called rail. From the common rail 4, lines 5 lead to the injection locations of an engine 6, in each of which a valve 7 is disposed; for adjusting the pressure in the common rail 4, the pressure regulating valve is provided, which may be disposed at the outlet of the high-pressure pump 2 or at the common rail 4.

The pressure regulating valve 1 itself has a valve body 8 with a bore 9 in which a pistonlike valve member 10 is disposed axially displaceably. A fastening flange 11 is disposed on the valve body 8, and by way of this flange the valve body is secured to the high-pressure pump 2 or to the common rail 4. In addition, a further chamber inside the valve body 8 is provided, in which an electromagnet 12 with a coil winding is disposed. A connection element 13 is provided on the valve body 8 and covers the chamber of the valve body 8.

In the prior art, a mechanical spring 15, embodied for instance as a helical spring, is provided in a recess 14 in the connection element. This spring exerts an additional force on the valve member 10 and assures closure of the pressure regulating valve 1, when the high-pressure pump is not active. In the prior art valve device, however, the spring 15 has not been of sufficient strength to enable a build-up of pressure in the rail 4 to enable an injection event to take place.

Supplying current to the electromagnet 12 causes the valve member 10 to be pressed farther against the valve seat 15 shown here, so that the fuel located in the inlet 17 cannot flow through the pressure regulating valve 1, thereby permitting a predetermined minimum pressure to build up in the rail to enable injection at a level for emergency operation.

Mode of Operation:

If the electromagnet 12 is not supplied with electric current, then both by its own weight and because of the spring action of the mechanical spring 15, the valve member 10 rests on the valve seat 16. The valve seat 16 is simultaneously acted upon by the pressure in the common rail 4, specifically via an area which is defined by the opening cross section of the inlet 17.

To make an injection event possible, the pressure in the common rail 4 must attain a minimum level. When the pressure regulating valve 1 is closed, this pressure can build up. If the pressure exceeds a maximum pressure, which can be regulated by the current in the electromagnet 12, the pressure regulating valve 1 opens, and the fuel can flow through the inlet 17 and the pressure regulating valve into a relief chamber, in this case into the fuel tank 3, to prevent excessive pressure from building up in the rail 4.

If the electromagnet fails, the area which is acted upon by the pressure through the inside diameter of the inlet assures that in the common rail 4, a minimum pressure of about 250 bar required for an injection can build up, and thus the pressure regulating valve 1, when it is not being supplied with electrical current, will not already open at lesser pressures.

Alternatively, a throttle element 18 can be provided in the inlet 17, and with it a minimum pressure beyond which the pressure regulating valve can be opened can be regulated.

In this way, the injection event and vehicle operation are made possible even if there is a malfunction in supplying current to the electromagnet 12.

The foregoing relates to a preferred exemplary embodiment of the invention, it being understood that other variants and embodiments thereof are possible within the spirit and scope of the invention, the latter being defined by the appended claims.

We claim:

1. A pressure regulating valve for regulating the pressure in a common rail in a fuel injection system for an internal combustion engine, comprising:

a pistonlike valve member guided axially displaceably in a bore, which valve member acts in the closing direction on a closing element and presses it against a valve seat, the valve member forming an armature of an electromagnet that can be supplied with electric current, wherein an opening cross section of an inlet (17) of the pressure regulating valve (1) is defined by a throttle element (18) in the inlet in such a way that the pressure regulating valve (1) cannot be opened until a predetermined minimum fuel pressure of about 250 bar, defined by the cross section of the throttle element, is exceeded, so that emergency vehicle operation is made possible.

* * * * *